(12) United States Patent
Beaupre

(10) Patent No.: US 7,367,286 B2
(45) Date of Patent: May 6, 2008

(54) IMPLEMENT FOR CARRYING WASTE

(76) Inventor: Daniel Beaupre, 3, Caron, Ville-Marie, Quebec (CA) J9V 1C2

( * ) Notice: Subject to any disclaimer, the term of this patent is extended or adjusted under 35 U.S.C. 154(b) by 124 days.

(21) Appl. No.: 11/325,017

(22) Filed: Jan. 3, 2006

(65) Prior Publication Data
US 2006/0219188 A1    Oct. 5, 2006

Related U.S. Application Data

(60) Provisional application No. 60/665,814, filed on Mar. 29, 2005.

(51) Int. Cl.
*A01K 27/00* (2006.01)
(52) U.S. Cl. ........................... 119/795; 119/792
(58) Field of Classification Search ................ 119/867, 119/858, 792, 794, 795, 796
See application file for complete search history.

(56) References Cited

U.S. PATENT DOCUMENTS

| | | | |
|---|---|---|---|
| 5,050,998 A * | 9/1991 | Wachtel | 383/6 |
| 5,429,075 A * | 7/1995 | Passarella et al. | 119/795 |
| 5,447,227 A | 9/1995 | Koseberg | |
| 5,713,616 A | 2/1998 | Knudson | |
| 5,727,500 A | 3/1998 | Conboy | |
| D393,504 S | 4/1998 | Eisman | |
| 6,035,809 A * | 3/2000 | Fingerett et al. | 119/796 |
| 6,129,096 A | 10/2000 | Johnson | |
| 6,199,737 B1 | 3/2001 | Ringelstetter | |
| 6,257,473 B1 * | 7/2001 | Ringelstetter | 224/675 |
| D453,067 S | 1/2002 | Cody | |

\* cited by examiner

*Primary Examiner*—Peter M. Poon
*Assistant Examiner*—Willie Berry, Jr.

(57) ABSTRACT

An implement for carrying waste while using a leash. The implement includes a leash receiving member for releasably securing the leash thereto. A waste receiving container is provided for receiving the waste thereinto. The container includes an attachment portion for releasably attaching the leash receiving member thereto. The container defines an upper opening for receiving the waste therethrough and a lower opening for releasing the waste therethrough. The container includes a trap for releasing the waste. The trap is operable between a closed configuration and an open configuration. In the closed configuration, the trap substantially blocks the opening. In the open configuration, the trap substantially frees the opening.

6 Claims, 6 Drawing Sheets

IMPLEMENT FOR CARRYING WASTE

This application claims priority based on Provisional Application No. 60/665,814 filed Mar. 29, 2005.

FIELD OF THE INVENTION

The present invention relates to the general field of waste management. More specifically, the present invention is concerned with an implement for carrying waste such as pet excrements.

BACKGROUND OF THE INVENTION

Many pet owners walk their pet using a leash. In many locations, it is required that pet owners clean-up after their pets. Accordingly, pet owners typically carry a bag or any such implement for picking up the waste after it has been laid by the animal. In addition, during relatively long walks, the owner may also produce wastes, for example in the form of empty food containers.

If the user is to pick up the waste and walk the animal, then the two hands of the user are typically required. One hand typically holds the leash while the other hand typically holds the container for the waste. While it is possible that a user uses a single hand to hold both a leash and a container, this may reduce one's ability to hold a firm grip on the leash.

In addition, plastic bags are often used to contain the waste. Such plastic bags are relatively aesthetically unpleasant and expose the pet owner to the various odors released by the waste and are also relatively fragile and may therefore become damaged during the walk.

Furthermore, especially during relatively long walks, the owner typically needs to carry other items such as, for example, a cell phone or other items related to the pet, such as toys. This requires the owner to use yet another container for these items.

Against this background, there exists a need in the industry to provide a novel implement for carrying waste.

OBJECTS OF THE INVENTION

An object of the present invention is therefore to provide an improved implement for carrying waste.

It is another object of this invention to provide for an implement which carries other useful accessories for a pet owner.

SUMMARY OF THE INVENTION

In a broad aspect, the invention provides an implement for carrying waste while using a leash. The implement includes a leash receiving member for releasably securing the leash thereto. A waste receiving container is provided for receiving the waste thereinto. The container includes an attachment portion for releasably attaching the leash receiving member thereto. The container defines an upper opening for receiving the waste therethrough and a lower opening for releasing the waste therethrough. The container includes an opening for releasing the waste. The opening is operable between a closed configuration and an open configuration. In the closed configuration, the opening is substantially blocked. In the open configuration, the opening is substantially unblocked.

In some embodiments of the invention, the waste receiving container is provided with pockets to receive items to be carried by the user. Also, in some embodiments of the invention, a reflective band is provided onto the container so as to improve the visibility of a pet owner at night.

Advantageously, the container is relatively ergonomic and relatively easy to use even by relatively inexperienced users.

The implement is relatively easily manufactured and relatively inexpensive. In addition, the implement is hygienic as it provides a further barrier between the waste that may be received in plastic bags, and the user.

The opening allows for relatively easy release of the waste into a waste disposal container, such as a garbage can. In addition, the use of an opening ensures that typically the user need not handle the waste after its collection.

Advantageously, the implement is usable with many types of currently existing leashes including retractable leashes.

The implement is attachable to the leash and therefore typically frees one hand, which improves the safety of the user when walking over slippery or uneven ground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION

Figure 1:
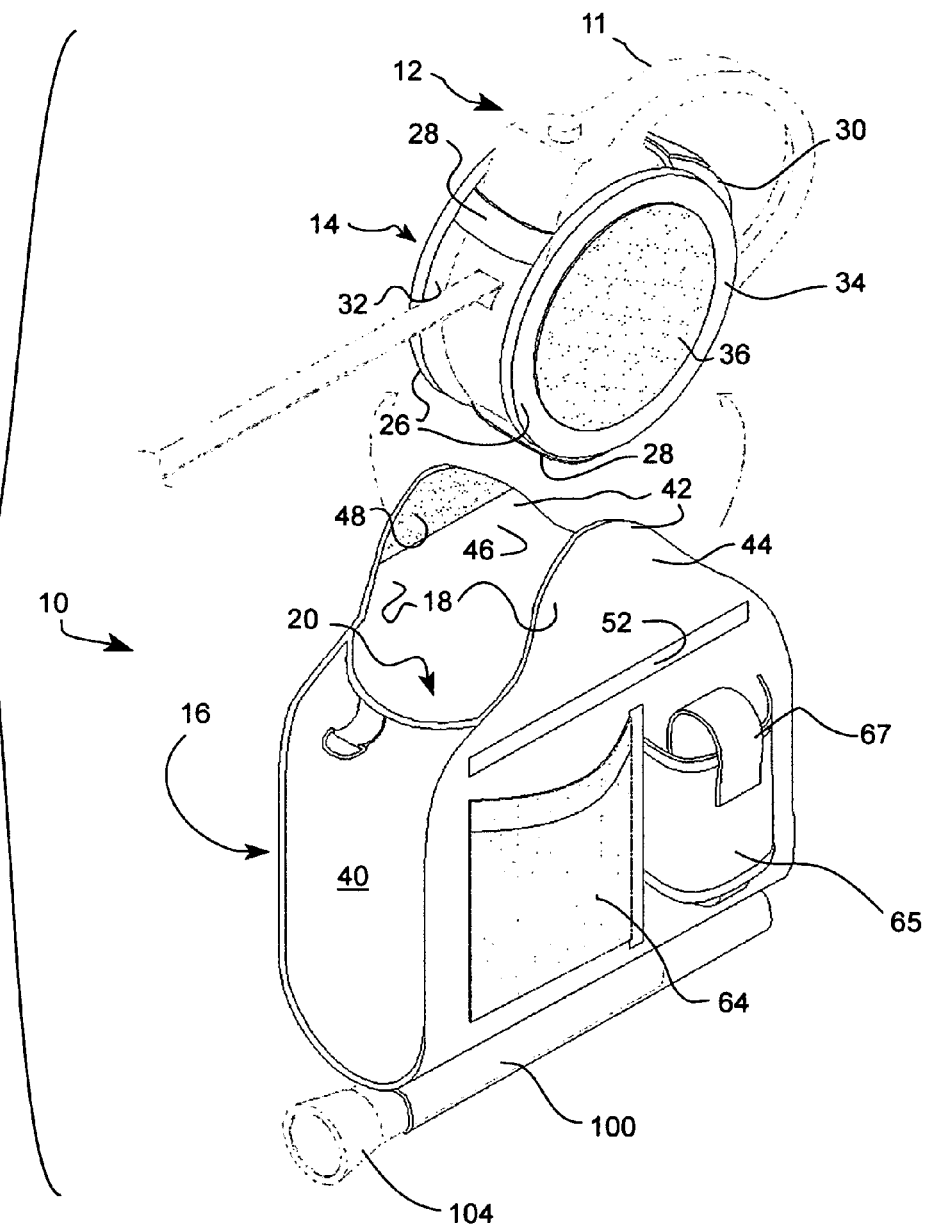
FIG. 1 Isometric view of the invention with the leash receiving member shown detached.
Figure 2:
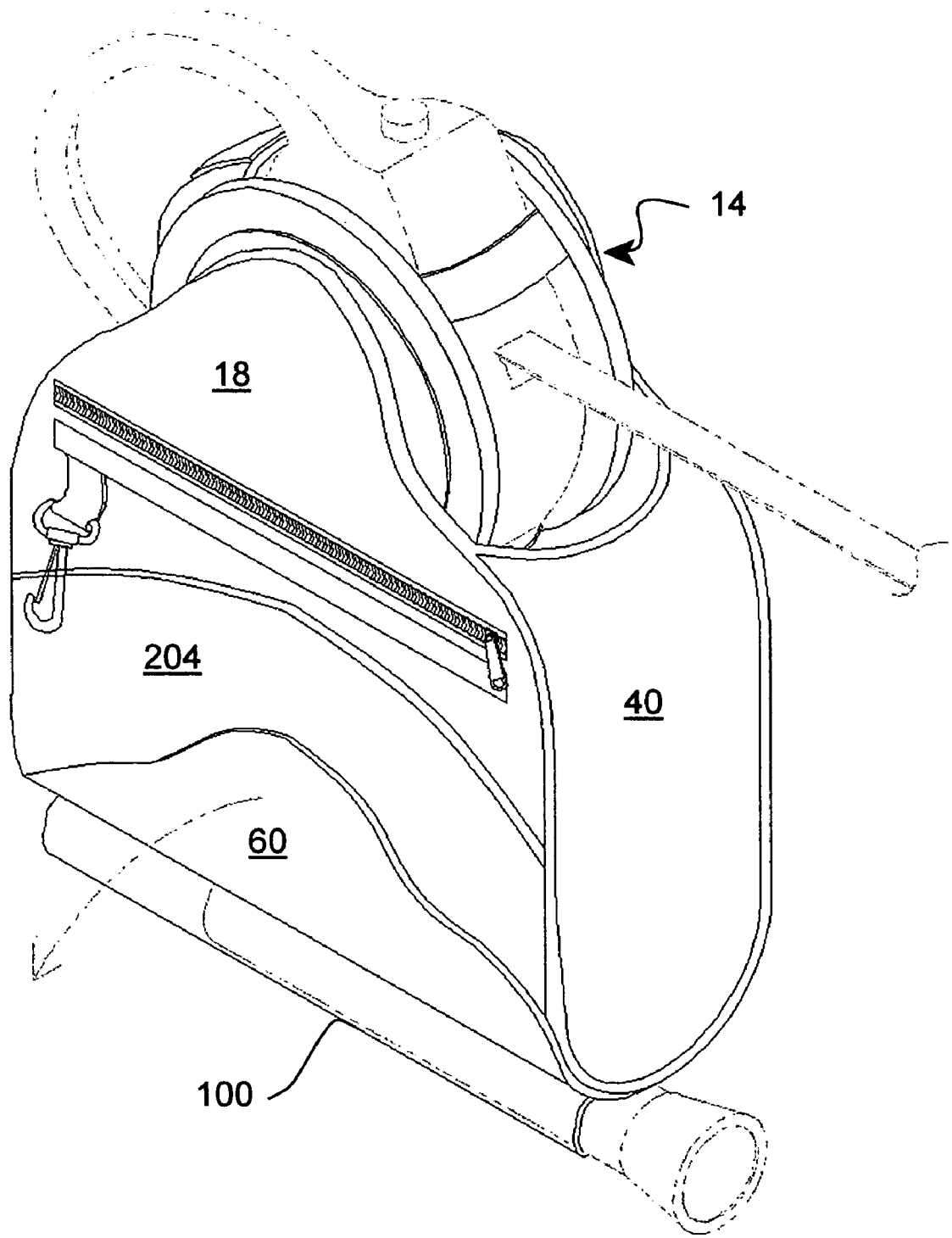
FIG. 2 Reverse angle view of FIG. 1.

An implement (10) for carrying waste (74) while using a leash (12) or a retractable leash (as shown). The implement (10) further includes a waste receiving container (16) for receiving the waste thereinto. The implement (10) includes hand holding means, one being a handle (15) while the other consisting of a leash receiving member (14) for releasably securing, thereto, a leash (12) of the retractable kind. When using a leash (12), that is retractable, its built-in handle (11) acts as the means for hand holding the implement (10). The container (16) includes an attachment portion (18) for releasably attaching the leash receiving member (14) or the handle (15) thereto.

Figure 3:
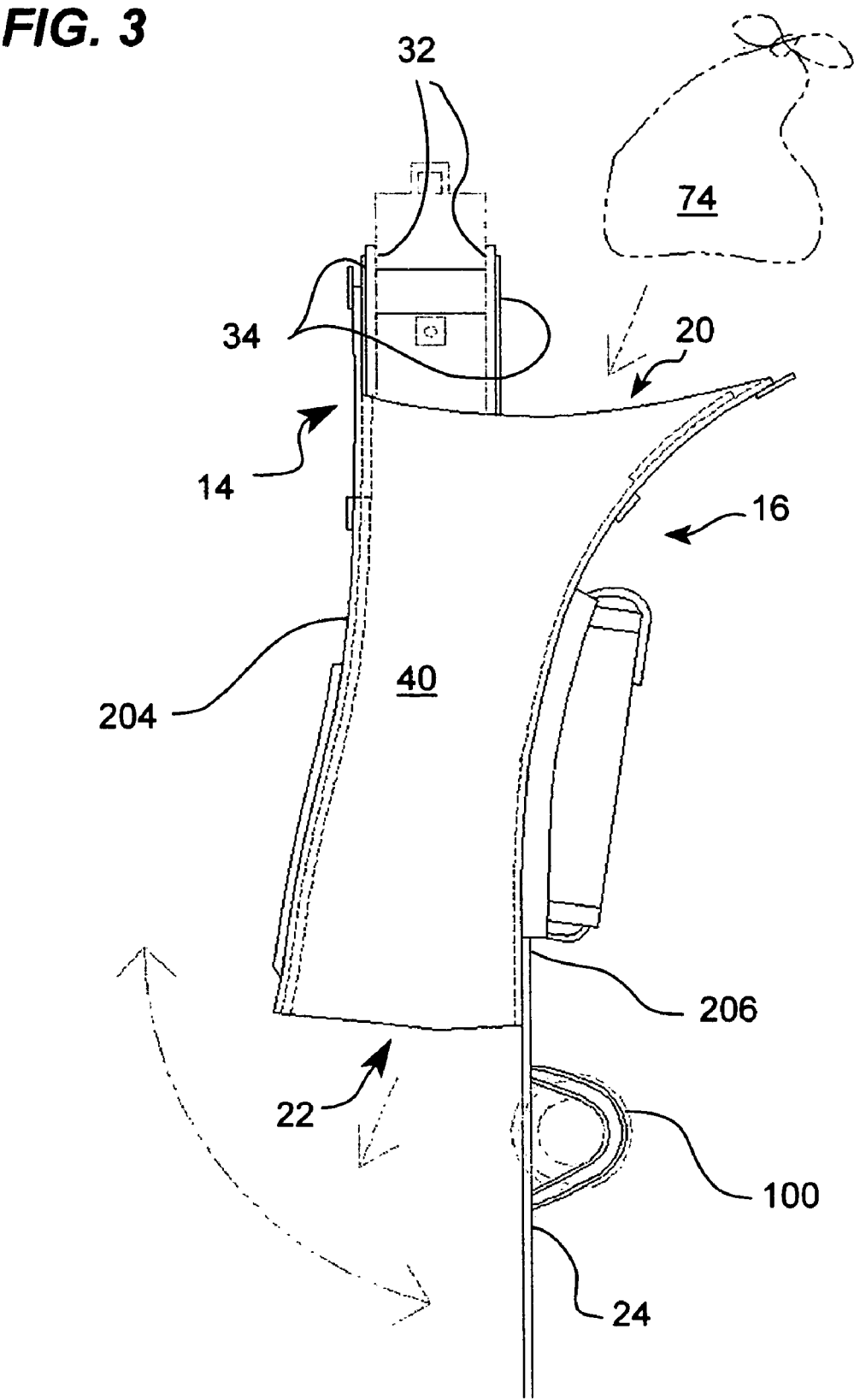
FIG. 3 Side view with both openings open.
Figure 4:
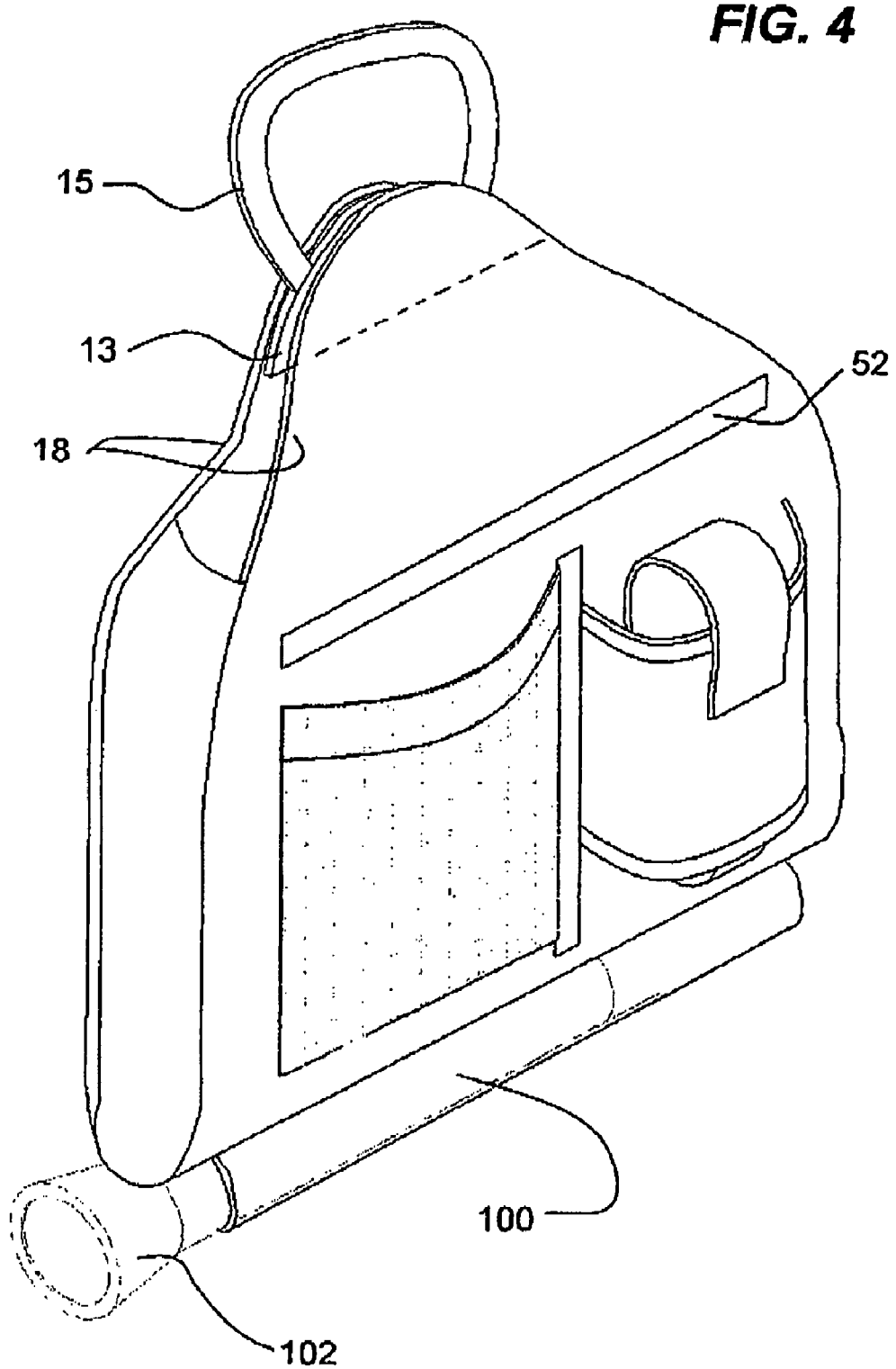
FIG. 4 Isometric view as in FIG. 1 but with a handle instead of the receiving member.
Figure 6:
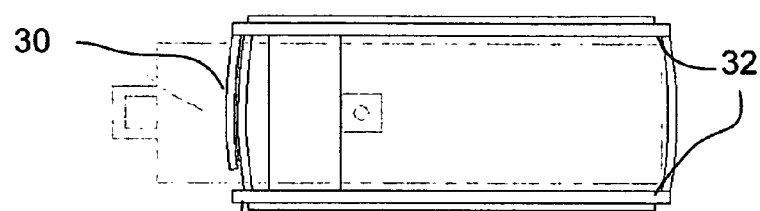
FIGS. 5-7 Top, side and front views, respectively of the leash receiving member with an retractable leash within.
Figure 5:
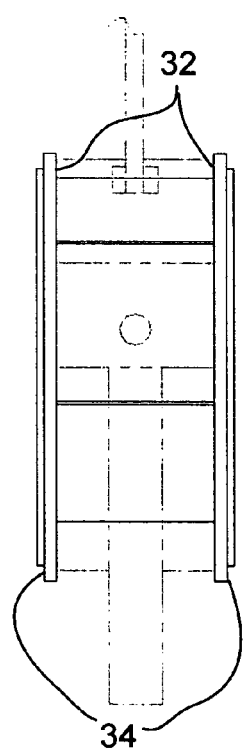
Figure 7:
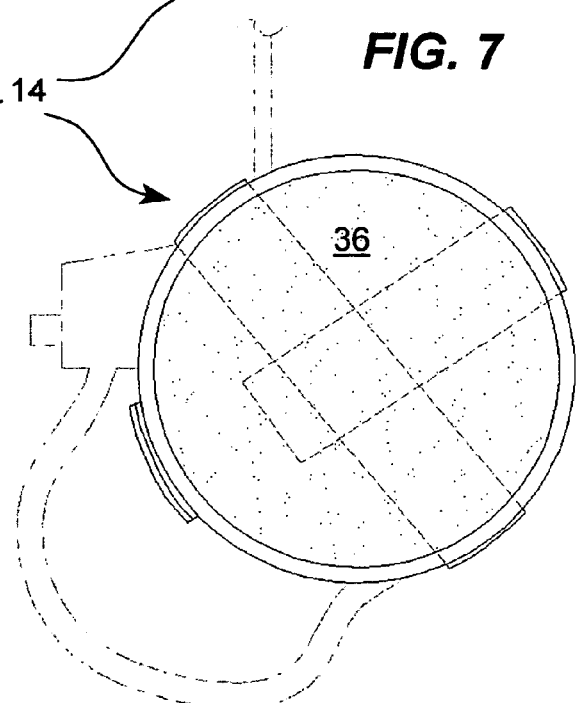
Figure 8:
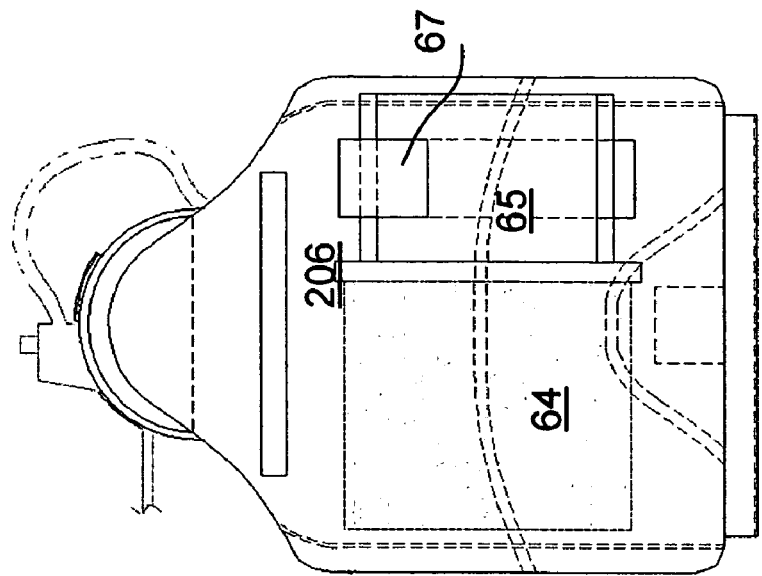
FIGS. 8-10 Side, front and reverse side, respectively of the invention.
Figure 9:
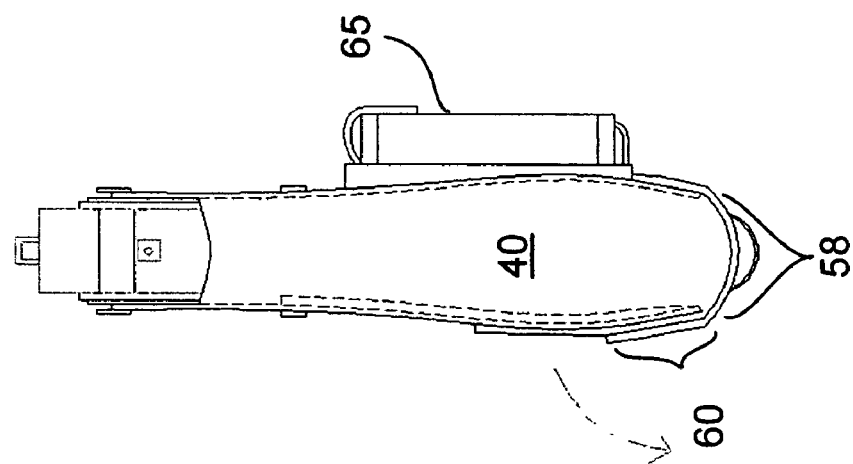
Figure 10:
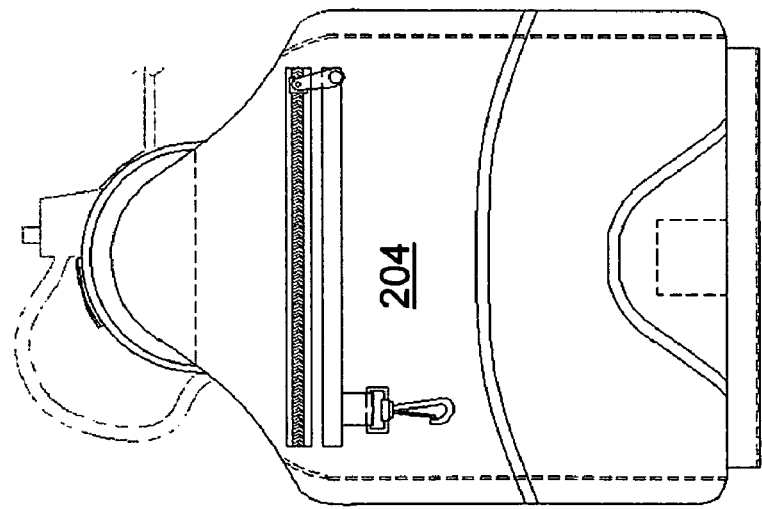

The container (16) defines an upper opening (20) for receiving the waste (74) therethrough and a lower opening (22) for releasing the waste (74) therethrough. A flap (24) is provided so that it is operable between a closed configuration and an open configuration. In the closed configuration, as shown for example in FIG. 9, the flap (24) substantially blocks the opening (22). In the open configuration, as shown for example in FIG. 3, the flap (24) substantially frees the opening (22).

Accordingly, the implement (10) allows an intended user to hold the leash (12) while carrying the container (16) with only one hand. The flap (24) allows for disposal of waste (74) inserted within the container (16), for example for releasing animal feces collected during a walk with a pet.

While the present document refers to upper and lower openings (20, 22), the reader skilled in the art will readily appreciate that these designations are only present to facilitate the description of the invention and are therefore not to be used to restrict the scope of the invention.

The leash receiving member (14) includes two substantially disc shaped side walls (26). The side walls (26) are interconnected through bands (28) extending therebetween. In embodiments of the invention wherein the leash (12) is a retractable leash, the leash (12) is receivable between the side walls (26) and is therefore maintained by the bands (28) in this position. The bands (28), which are preferably elastic, allow using the leash receiving member (14) with retractable leashes of different dimensions.

In addition, to provide additional securing of the retractable leash (12) to the leash receiving member (14), a closing device is provided. For example, the closing device includes first and second overlapping flaps (30) held together by a hook/loop materials. It is however within the scope of the invention to have closing mechanisms that differ from the above described mechanism.

The side walls (26) each define respective inner surfaces (32) and outer surfaces (34). The inner surfaces (32) contact the leash receiving member (14), while the outer surfaces (34) are provided with a hook/loop type material (whether the outer surface is made of hook or pile material is unimportant for as long as the surface to be made contact onto has the complementary material s in order to be operative). In this case, the outer surfaces (32) make contact with a hook/loop material (48) part of the attachment portion (18).

In an alternate embodiment, when a regular non-retractable leash (not shown) is used the handle (15) having a hook/loop base (13) is used. To releasably attach the handle (15) he attachment portion (18) is used as when used with the leash receiving member (14), that is, pressure is applied onto the base (13) by the attachment portion (18) and its hook/loop material (48).

The waste receiving container (16) includes a front wall (40), a rear wall which is a mirror image (not shown), a side wall (204) and a reverse side wall (206). All aforementioned walls (40, 204, 206), also collectively known as four walls (40, 204, 206), define both the lower opening (22) and the upper opening (20). The flap (24) extends from the reverse side wall (40) and when folded, reaches across the lower opening (22), so as to substantially block it by way of a blocking portion (58), and terminates onto the side wall (204) with a flap attachment portion (60) for attaching to the side wall (204). When in an open configuration, the flap (24) allows any object contained within the container (16) to be released through the opening (22). In addition, the attachment portion (18) extends from both the side (204) wall and reverse side wall (206).

In some embodiments of the invention, at least one reflective band (52) is provided onto the extension outer surfaces. However, such reflective bands are not necessarily provided in all embodiments of the invention.

Non-limitatively, the flap attachment (60) is attachable to the side wall (204) through the use of and hook/loop materials. Since this attachment method has been described in details hereinabove, no further details regarding the attachment are given hereinbelow.

In some embodiments of the invention, the side or reverse side walls (204, 206) have flat pockets (64) or full pockets (65) which are usable, for example to carry keys, a cell phone, or plastic bags for picking up the waste, among others. The pockets (64, 65) may be mesh pockets, or include a securing flap (67) among various possibilities.

In some embodiments of the invention, the implement (10) includes a fabric and the handles and hook and loop type pieces of material are secured thereto using glue or through sewing. However, it is within the scope of the invention to have implements including any other suitable material and to secure hook and loop pieces of material thereto using any other suitable methods.

The waste receiving container (16) may, at the same time, receive and release the waste (74). However, the reader skilled in the art will readily appreciate that in a typical use, the implement (10) either only receives the waste (74) or releases the waste (74).

To insert the waste (74) into the container (16), one of the attachment portion (18) is detached from the leash receiving member (14), or the base (13), as the case may be, this frees the upper opening (20) and allows the insertion of the waste (74) therethrough. Then, the user reattaches the attachment portion (18).

To release the waste (74), the flap (24) is detached from the side wall (204) so as to free the bottom opening (22). This allows the waste (74) to fall through this lower opening 22 through the action of gravity. Then, the user may simply reattach the flap (24).

Optionally, the implement (10) has a flashlight receiving pocket (100). The flashlight receiving pocket (100) is provided for receiving at least partially thereinto at least one flashlight (102). Also, it is within the scope of the invention to receive any other suitable object within the flashlight receiving pocket 100, such as for example umbrellas and sticks, among others.

The flashlight receiving pocket 100 is substantially hemi-cylindrical and made of a resiliently elastically deformable material, this allows to secure flashlights (102) of differing diameters.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An implement for carrying wastes while using a leash, said implement comprising:
    a waste-receiving container for receiving the wastes thereinto, said waste receiving container having a front wall a rear wall, a side wall and a reverse side wall, collectively known as four walls, and said four walls defining both a lower opening and an upper opening;
    said container further including an attachment portion releasably attaching a hand holding means, consisting of a leash receiving member, thereto;
    defining said upper opening for receiving the wastes therethrough and said lower opening for releasing the wastes therethrough; and
    said lower opening being operable between a closed configuration and an open configuration, wherein in said closed configuration said opening being substantially blocked and in said open configuration, said opening being substantially open
    said attachment portion extending from both said side wall and said reverse side wall;
    said lower opening being substantially blocked when in a closed configuration by way of a flap;
    said flap extends from said reverse side wall and when folded, reaches across said lower opening, so as to substantially block it by way of a blocking portion, and terminates onto said side wall with a flap attachment portion attaching to said side wall;
    said flap attachment portion attaching to said side wall by way hook/loop materials;
    said container includes said attachment portion releasably attaching said leash receiving member thereto;
    said leash receiving member having two substantially disc shaped side walls;
    said side walls being interconnected through bands extending therebetween.

2. An implement for carrying wastes as in claim 1 wherein:
    said bands being elastic.

3. An implement for carrying wastes as in claim 1 wherein:
    said retractable leash being receivable between said side walls and maintained in position by said bands.

4. An implement for carrying wastes as in claim 1 wherein:
    said side walls each defining respective inner surfaces and outer surfaces;
    said inner surfaces contacting said leash receiving member while said outer surfaces being provided with a hook/loop type material; and
    said outer surfaces making contact with a hook/loop material part of said attachment portion.

5. An implement for carrying wastes as in claim 1 wherein:
    said flap having a flashlight receiving pocket.

6. An implement for carrying wastes as in claim 5 wherein:
    said flashlight receiving pocket being substantially hemi-cylindrical and made of a resiliently elastically deformable material.

* * * * *